Jan. 27, 1959 — L. W. STAPLES — 2,870,823
SPRING STRUCTURES
Filed March 13, 1956 — 3 Sheets-Sheet 1

INVENTOR.
LYNN W. STAPLES
BY
*Fearman & Fearman*
ATTORNEYS

Jan. 27, 1959  L. W. STAPLES  2,870,823
SPRING STRUCTURES

Filed March 13, 1956  3 Sheets-Sheet 2

INVENTOR.
LYNN W. STAPLES
BY
Fearman & Fearman,
ATTORNEYS

Jan. 27, 1959     L. W. STAPLES     2,870,823
SPRING STRUCTURES

Filed March 13, 1956     3 Sheets-Sheet 3

*INVENTOR.*
LYNN W. STAPLES
BY *Fearman & Fearman.*
ATTORNEYS

United States Patent Office 2,870,823
Patented Jan. 27, 1959

2,870,823

SPRING STRUCTURES

Lynn W. Staples, Saginaw, Mich., assignor to Saginaw Wire Products Inc., Saginaw, Mich.

Application March 13, 1956, Serial No. 571,273

3 Claims. (Cl. 155—179)

This invention relates to spring seat or back structures of the type embodying a plurality of relatively flat springs of suitable contour which are secured in spaced apart relation between a pair of frame members and more particularly to a spring assembly having springs which are designed so that they can be attached to the frame members in a novel and improved manner.

It is conventional practice in the furniture and automotive industries to employ fabric lined sheet metal clips or the like to secure the ends of the wire springs employed to such frames. These clips must be nailed to the frame and special nails have been required to anchor them in position. This practice is disadvantageous in many respects apart from the well known fact that a great deal of labor time is, as a result, required in the fabrication of seats and backs. Since substantially the entire load is imparted to the clips when a weight is applied to the springs, the clips tend to open under stress and the life of spring seat structures employing such clips is materially reduced. Further, since the relatively small clips transmit pressures only to localized portions of the frame, the pressures transmitted to the frame by the clips are applied to restricted portions of the frame members which in the furniture industry, for example, are of wood construction. When heavy pressures are applied to the springs these localized portions of the frame have a tendency to splinter off.

One of the primary objects of the instant invention is to provide a spring seat or back structure, or the like, wherein the relatively flat springs employed are so designed that they can be very easily and rapidly mounted in position by relatively unskilled workmen, thus greatly decreasing the labor cost involved in fabricating structures of this nature.

Another object of the invention is to design a spring structure of the character described which eliminates the use of conventional clips and special nails so that the considerable cost of such fasteners need no longer be reflected in the cost of fabricating the spring structure.

A further object of the invention is to design a spring structure of the type described wherein the springs are more securely fixed to the rails than springs which were anchored with the well known clips, and in which the springs transmit the pressures applied directly to the rails or side frame members, the pressures being applied to the rails in such a manner that the load is uniformly distributed to and borne by substantial portions of the rails.

Another object of the invention is to provide a spring structure which distributes the load to the rails so that it is borne in part by the sides of the rails and in part by the upper edges thereof.

A further object of the invention is to design a spring structure having springs which can be mounted in position without the use of tools of any kind so that it is no longer necessary to provide expensive, special purpose tools for each workman on the assembly line.

Another object of the invention is to provide a spring structure employing sinuous type springs which can be very easily and rapidly disassembled from the structure when desirable for replacement or the like without in any way weakening or damaging the springs or frame.

A further object of the invention is to provide a spring structure having springs so designed that they can simply be snapped into a position in which they are for practical purposes locked on the frame.

A still further object of the invention is to provide a spring structure employing side rails and wire springs which can be very easily and economically formed on a mass production scale.

With the above and other objects in view, the present invention consists in the combination and arrangement of parts hereinafter more fully described, illustrated in the accompanying drawing, and more particularly pointed out in the appended claims, it being understood that equivalent changes may be made in the various elements which comprise the invention without departing from the spirit thereof or the scope of the appended claims.

In the drawings:

Fig. 1 is a fragmentary, top plan view showing several of the springs to which I refer mounted in position on a seat frame or the like.

Figure 1:
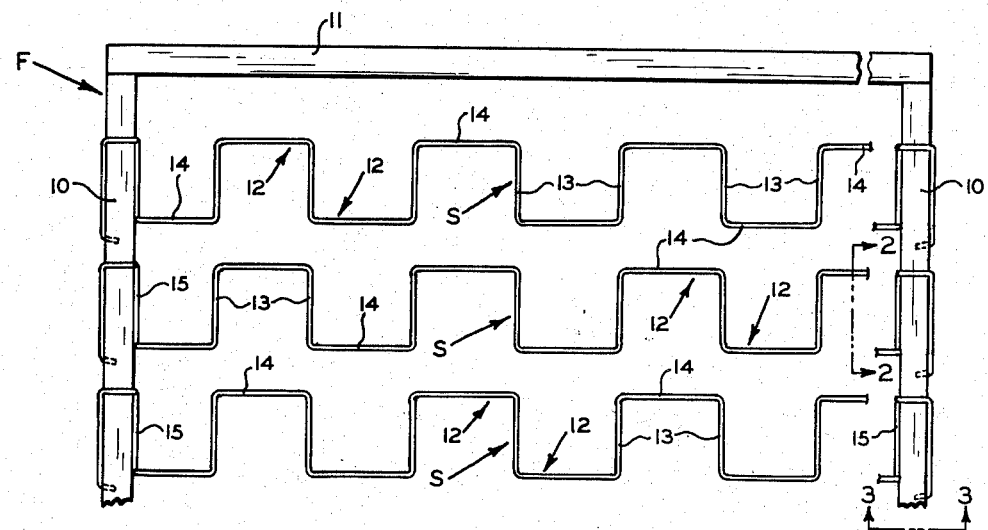
Figure 2:
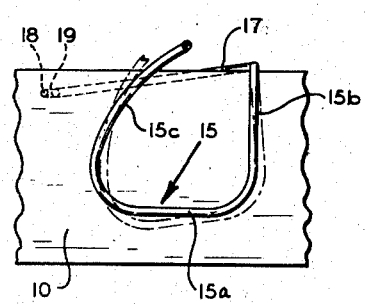
Fig. 2 is an enlarged fragmentary view taken on the line 2—2 of Fig. 1, the broken lines illustrating the position assumed by a loop section of the attaching end of the spring when a load is applied.

Referring now more particularly to the accompanying drawings and initially to Figs. 1–4 thereof a numeral F generally designates the frame of a seat or back structure which includes side frame or rail members 10 and end frame members 11 (Fig. 1). The frame members 10 and 11 are shown as of wood construction however it is to be understood that they could be formed of metal or any other suitable material.

Shown mounted on the side rails 10 are relatively flat, sinuous springs S which are uniformly arched to a slight degree from their ends to the central portions thereof as is usual with conventional sinuous springs of this type. The particular shape of the loops 12 which are formed in the springs to permit their longitudinal expansion or extension under load is unimportant to the invention and for convenience sake the loops are shown as comprising torsion sections 13 and spacing sections 14 forming what may be termed square-shaped loops.

Figure 3:
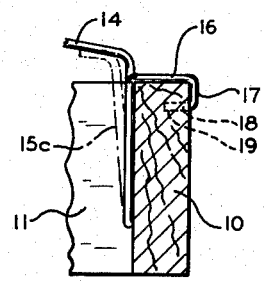
Fig. 3 is an enlarged, sectional, elevational view taken on the line 3—3 of Fig. 1.
Figure 4:
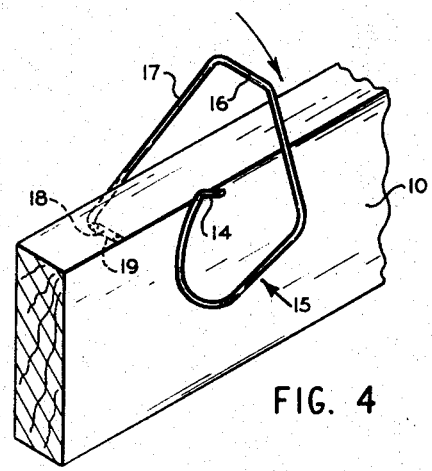
Fig. 4 is an enlarged, fragmentary, isometric view illustrating the manner in which the ends of the spring are applied to the side rails and lock thereon.

The instant invention is concerned with the configuration of the ends of the springs which are designed so that they may be secured to the rails 11 in a novel manner whereby the load is distributed directly to multiple load bearing surfaces of the rails. In Figs. 1-4 of the drawings a so-called "tight seat" construction is illustrated wherein the end spacer sections 14 terminate at a point only slightly above the inner faces of the rails (Fig. 3) and the ends are thence shaped to snap on the rails, however conventional "fishmouth" sections such as shown at 13—13 in Patent No. 2,684,844, issued July 27, 1954, to H. C. Flint et al. could be provided, and the novel attaching ends, which I will describe, could extend from the lower ends of these fishmouth sections which would similarly terminate adjacent the upper edges of the side rails 10. Each attaching end of the springs S in Figs. 1-4 includes a loop portion 15 extending from the end spacer section 14 at substantially right angles to the sinuous body of the particular spring, which is disposed adjacent the inner face of the rail 10 (Fig. 3) when the spring is locked in postion to form a bearing section with sections 15a and 15b of the loop exerting a laterally directed bearing pressure on the inner face of the rail when a load is applied to the spring. The upper end of the angular torsion section 15c of each loop 15 tends to be pulled inwardly toward the body of the spring when a load is applied to the spring and at the same time tends to be moved in a direction away from the leg 15b to open the loop 15 (see the broken line position in Fig. 2). The entire loop 15 in each case is normally in tight engagement with the inner face of the rail 10 as shown in Fig. 3. When a load is applied to the spring, much of the force which tends to pull a section 15c inwardly is distributed by the sections 15a and 15b to the rail and the section 15c resists the force tending to unwind the loop 15. This stress is also absorbed by the upper edge of each rail 10 through the longitudinally extending or bridging sections 16 of the spring which extend across the tops of the rails from the legs 15b of the loops.

Leading from the portions 16 each spring end has an angular section 17 extending reversely to the portion 15a which terminates in a leg 18 adapted to be received in an opening 19 provided in the outer face of the rail. Openings 19 are formed in the rails at spaced apart intervals prior to assembling the springs S thereon and plainly the rails could also be grooved to receive the sections 16 and 17 if desired. The openings 19 are slightly angular to receive the very moderately askew ends 18. It will be observed that the sections 17 extend beyond the torsion sections 15c of the loops so that the ends 18 are offset from the loops 15 to lend stability to the structure.

In assembling the springs S on the frame the workman or workmen grasp the ends of a spring and tip it up on its side (the loops 15 thence being substantially vertically disposed or vertically inclined) so that the loops 15 are located above the rails 10. By elongating the spring slightly the terminal ends 18 are inserted into the openings 19. Thence the workman grasps the looped portions 12 of the spring near the ends thereof and pivots the spring downwardly about the ends 18 as fulcrums toward the position in which it is shown in Fig. 1. Initially when the spring is being twisted downwardly, the workman draws the loops 15 toward the faces of the rails 10 against which they will be disposed (the inner faces) so that they clear the upper edges of the rails and the loops 15 then slide down the inner faces of the rails (see Fig. 4). The spring actually snaps down into locked position and a weight applied to the spring tends, of course, to hold it in locked position rather than to disengage it. Border wires extending parallel to the rails 10 and secured thereto may be employed to positively tie the ends of the springs down although this is not a necessary practice and, of course, the upholstering may then be fixed to the frame to cover the springs.

Both faces of each rail and an edge thereof are loaded by a weight placed on a spring so that the spring obviously distributes the load to relatively large portions of the rails. The fact that all of the force transmitted to a rail is not transmitted to one face but rather is distributed to multiple surfaces thereof is, of course, important.

Figure 7:
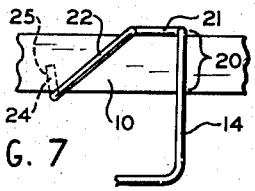
Fig. 7 is a fragmentary, top plan view thereof showing the spring mounted on a side rail.
Figure 6:
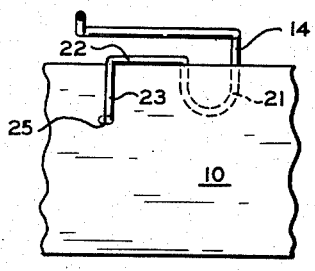
Fig. 6 is an elevational view similar to Fig. 2 of this second embodiment of the invention.
Figure 5:
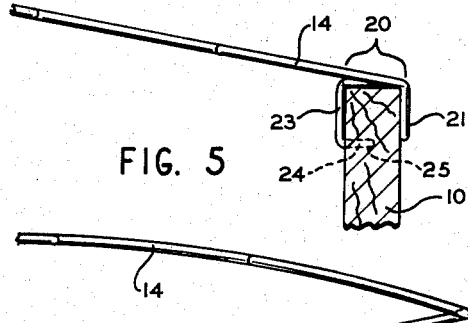
Fig. 5 is a view similar to Fig. 3 illustrating a modified embodiment of the invention.

In Figs. 5-7 I have shown another modification of the invention in which the end spacer sections 14 of the spring do not terminate at the inner faces of the rails 10 but have portions 20 extending immediately across the upper edges of the rails. A depending loop 21 which bears against the outer face of each rail is thence formed on the end of each portion 20 and sections 22 extending therefrom lead back across the upper edge of each rail at an angle. From the sections 22 the ends of the wire spring lead downwardly across the inner faces of the rails as at 23 and terminate in longitudinally extending legs 24 which are adapted to be received in openings 25 bored at spaced intervals in the rails.

The assembly of this spring is substantially identical in that the terminal ends 24 of the spring are first inserted in the openings 25 while the spring is turned up on its side as before. Thence the spring is turned downwardly so that the ends thereof snap into position on the rails, the loop portions 21 being pushed outwardly toward the outer faces of the rails initially so that they clear the upper edges of the rails and thence slide down along the outer faces thereof.

Figure 10:
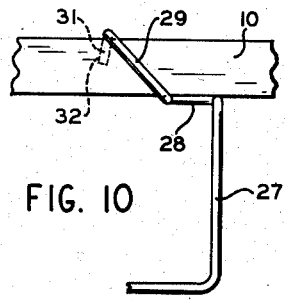
Fig. 10 is an enlarged, fragmentary, top plan view of this third embodiment of the invention showing the spring locked in position on a side rail.
Figure 9:
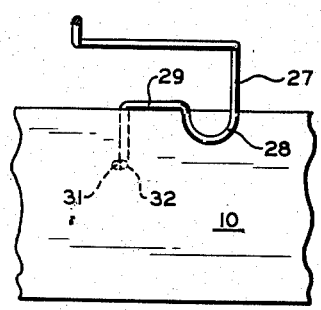
Fig. 9 is an elevational view thereof similar to Fig. 2.
Figure 8:
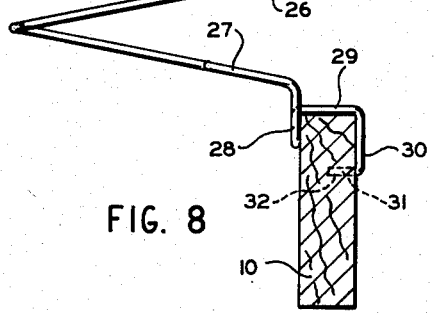
Fig. 8 is a sectional, elevational view similar to Fig. 3 of a third embodiment of the invention.

In Figs. 8-10 still another embodiment of the invention is illustrated in which sinuous "fishmouth" sections 26 and 27 are provided on the end spacer sections which terminate above the inner faces of the rails 10 as shown. Depending loops 28 are formed on the ends of the sections 27 to bear against the inner faces of the rails when a weight is applied to the springs and the spring ends thence lead angularly across the upper edges of the rails as at 29. Formed on the portions 29 are depending sections 30 which lead downwardly along the outer faces of the rails and terminate in inwardly extending ends 31. The ends 31 are adapted to be received in openings 32 provided at spaced intervals in the outer faces of the rails as before. This is a so-called "loose cushion" construction where some of the load is absorbed by the "fishmouth" sections 26—27. The loops 28 are considerably smaller than the loops 15 shown in the first embodiment of the invention and are relatively "stiff" in comparison.

The assembly of this spring is in all respects similar to the assembly of the spring depicted in Figs. 1-4. Since the loops 28 are considerably smaller than the loops 15 there will, of course, be less deformation of the loops when downward pressures are applied to the spring.

Figure 13:
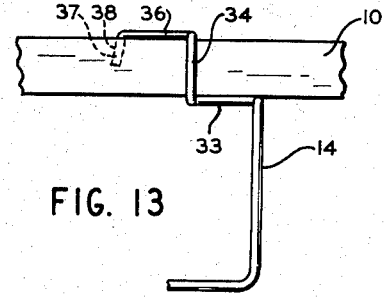
Fig. 13 is a fragmentary, top plan view of this fourth embodiment showing the spring mounted on a side rail of the frame.
Figure 12:
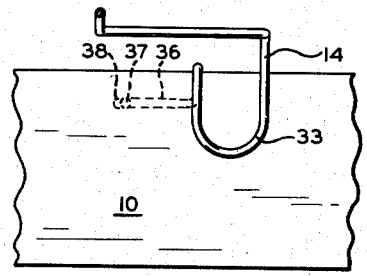
Fig. 12 is an elevational view thereof similar to Fig. 2.
Figure 11:
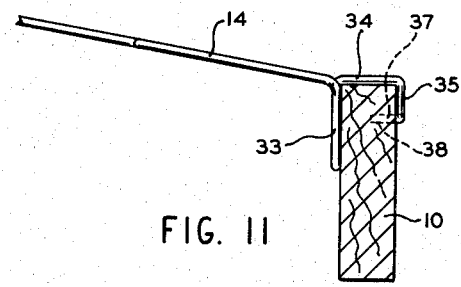
Fig. 11 is a view similar to Fig. 3 of a fourth embodiment of the invention.

In Figs. 11-13 a fourth embodiment of the invention is illustrated in which the end spacer sections 14 of the spring terminate directly adjacent the inner faces of the rails 10 and loop sections 33 are provided thereon to bear against the rails when a load is applied. The ends of the spring thence extend across the upper edges of the rails as at 34 and downwardly along the outer faces of the rails 10 as at 35. Laterally turned sections 36 extend from the portions 35 and terminate in inwardly turned ends 37 which are received within openings 38 provided in the rails. The assembly of this spring on the rails is, of course, identical to the assembly of the embodiment of the invention depicted in Figs. 1-4.

Figure 16:
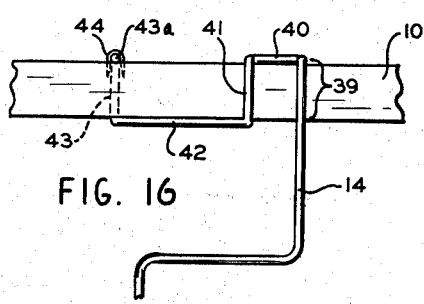
Fig. 16 is a fragmentary, top plan view of this fifth embodiment of the invention showing one end of the spring secured on a side rail.
Figure 15:
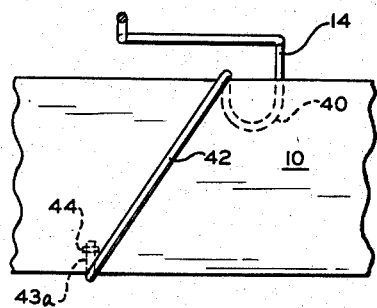
Fig. 15 is an elevational view similar to Fig. 2 of this embodiment of the invention.
Figure 14:
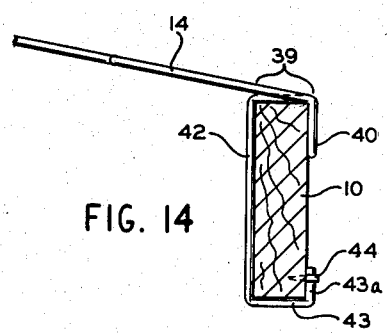
Fig. 14 is a view similar to Fig. 3 of a fifth embodiment of the invention.

In Figs. 14-16 I have shown a final embodiment of the invention in which the end spacer sections 14 of the spring have portions 39 leading immediately across the upper edges of the rails as shown. Loops 40 adapted to bear against the outer faces of the rails are thence provided on the ends of the bridging portions 39 and the ends of the springs lead reversely back across the upper edges of the rails as at 41 and angularly downwardly as at 42 across the inner faces of the rails to sections 43 which hook around the bottom edges of the rails. The terminal ends 43a may be secured against lateral movement by a brad 44. Alternately an opening could be provided in the lower edge of each rail in which the end 43a could be received as in the previous embodiments. In assembling this spring on the rails 10 the sections 43 are, of course, first hooked under the rails while the spring is tilted so that the loop portions 40 are above the rails. When the spring is in this tilted position, the portions 42 are substantially in a vertical position and thence the loops 40 are pushed slightly outwardly to clear the upper edges of the rails as the spring is swung downwardly to locked position.

It should be apparent that I have perfected a greatly improved spring and spring structure which will find wide use in the furniture, automotive, and other industries.

It is to be understood that the drawings and descriptive matter are in all cases to be interpreted as merely illustrative of the principles of the invention rather than as limiting the same in any way since it is contemplated that various changes may be made in the various elements to achieve like results without departing from the spirit of the invention or the scope of the appended claims. Where the term "body" of the spring is used, for example, the term refers to the entire spring except for the ends which attach to the rails and includes "fishmouth" sections or the like if the spring is provided with such sections.

What I claim is:

1. In a spring assembly; a pair of transversely spaced apart longitudinally extending frame members, at least one of which has a side surface with a substantially flat portion extending longitudinally; a weight supporting spring wire having a load supporting deck section extending transversely relative to said members; and sections extending from said deck section secured to said frame members; at least one end section having a planar loop portion extending longitudinally in a longitudinal plane parallel to said portion of the frame member and sidewise adjacent thereto so that said loop has load distributing bearing engagement with said portion of the frame member over a substantial portion of its extent when a load is applied to said deck section; and means securing said end sections to said frame members.

2. In a spring assembly; a pair of transversely spaced apart longitudinally extending frame members; a weight supporting spring wire having a load supporting deck section extending transversely relative to said members; end sections extending from said deck section secured to said frame members; at least one end section having a portion extending transversely to the extent of the frame members across the width of one of the frame members and portions connected thereto on opposite sides of the said one frame member extending longitudinally in a longitudinal plane parallel to the said one frame member adjacent the sides of the said one frame member; said portions on opposite sides of the said one frame member being spaced apart a distance slightly less than the width of the frame member to snap thereon.

3. The combination defined in claim 2 in which the said one frame member has an opening therein extending widthwise of the frame member and said end section has a leg extending into said opening and providing a fulcrum about which the spring can be revolved to snap the said spaced apart portions down on opposite sides of the said one frame member from a position outward of the said one frame member.

References Cited in the file of this patent
UNITED STATES PATENTS

| | | |
|---|---|---|
| 218,983 | Kellogg | Aug. 26, 1879 |
| 254,372 | Purefoy | Feb. 28, 1882 |
| 688,413 | Harbison | Dec. 10, 1901 |
| 2,248,093 | Kronheim et al. | July 8, 1941 |
| 2,540,779 | Forbes | Feb. 6, 1951 |

FOREIGN PATENTS

| | | |
|---|---|---|
| 52,637 | Switzerland | Feb. 14, 1910 |